United States Patent [19]

Kawaguchi

[11] Patent Number: 4,592,520
[45] Date of Patent: Jun. 3, 1986

[54] WEBBING TENSION DEVICE

[75] Inventor: Teruhiko Kawaguchi, Aichi, Japan

[73] Assignee: Kabushiki Kaisha Toka-rika-denki-seisakusho, Aichi, Japan

[21] Appl. No.: 695,882

[22] Filed: Jan. 29, 1985

[30] Foreign Application Priority Data

Jan. 30, 1984 [JP] Japan .................................. 59-11428

[51] Int. Cl.$^4$ ........................ B60R 22/46; B65H 75/48
[52] U.S. Cl. .................................... 242/107; 280/806
[58] Field of Search .......... 242/107, 107.4 R–107.4 E; 280/806, 807; 297/475–478

[56] References Cited

U.S. PATENT DOCUMENTS 4,447,017 5/1984 Inukai ............................. 242/107 X
4,471,918 9/1984 Ando ................................. 242/107

Primary Examiner—John M. Jillions
Attorney, Agent, or Firm—Sixbey, Friedman & Leedom

[57] ABSTRACT

In a webbing tension device for imparting a tension to an occupant restraining webbing in an emergency situation of a vehicle, large biasing means for biasing a webbing takeup shaft in a webbing winding direction in the emergency situation of the vehicle is wound up by such winding-up drive means as a motor through reduction means and clutch means is disposed between the large biasing means and the reduction means. Accordingly, a rotation force of the winding-up drive means is transmitted to the large biasing means only when the large biasing means is wound up by the winding-up drive means.

20 Claims, 6 Drawing Figures

WEBBING TENSION DEVICE

BACKGROUND OF THE INVENTION

1. Field of the Invention

The present invention relates to a webbing tension device which imparts tension to an occupant restraining webbing to closely restrain an occupant of a vehicle during an emergency situation.

2. Description of the Prior Art

Seatbelt systems for restraining an occupant of a vehicle during an emergency situation are constructed so that the occupant wears an occupant-restraining webbing, one end of which is wound in a webbing retractor.

This webbing retractor for winding the webbing therein imparts predetermined tension to the webbing. However, since the retracting force of the webbing retractor is made relatively small or zero so as not to give the occupant a feeling of oppression, a clearance or slack between the webbing and the occupant wearing the same is often formed. Accordingly, there is concern over the fact that the occupant wearing the webbing may be moved forward in the vehicle by the amount of the clearance or slack in the webbing in an emergency vehicular situation before the occupant is securely restrained by the webbing.

In order to overcome this problem, webbing tension devices have been proposed where a large biasing force from a large spiral spring is transmitted to a webbing takeup shaft of the webbing retractor, so that a substantial tension is imparted to the webbing in an emergency vehicular situation.

In such a webbing tension device, in an ordinary vehicular situation, the webbing is weakly biased in the webbing winding direction by a small spiral spring, but in an emergency vehicular situation, the large biasing force of the large spiral spring is transmitted to the takeup shaft so that the webbing is forcibly wound on the takeup shaft. However, the large biasing force continues to act upon the takeup shaft even after the termination of the emergency vehicular situation, which results in deterioration in the operability of the webbing retractor when the webbing is released from its occupant restraining position or when the seatbelt system is reused.

SUMMARY OF THE INVENTION

In view of the above fact, the present invention has as its object the provision of a webbing tension device in which the large biasing force of a large biasing means does not act upon the takeup shaft after the termination of the emergency vehicular situation and the seatbelt system is capable of being put in a reusable situation by a one-touch operation of the occupant.

In the webbing tension device of the present invention, the frame of the webbing retractor is provided with a winding-up drive means which includes a motor and a gear reduction means for reducing the rotational force of the winding-up drive means, a clutch means disposed between the gear reduction means and a large biasing force means, wherein the rotational force of the winding-up drive means may be transmitted to the large biasing force means by an operation of the occupant only when the large biasing force means is wound up.

Accordingly, the webbing tension device can readily be reset by a one-touch operation of the occupant.

BRIEF DESCRIPTION OF THE INVENTION

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 1:
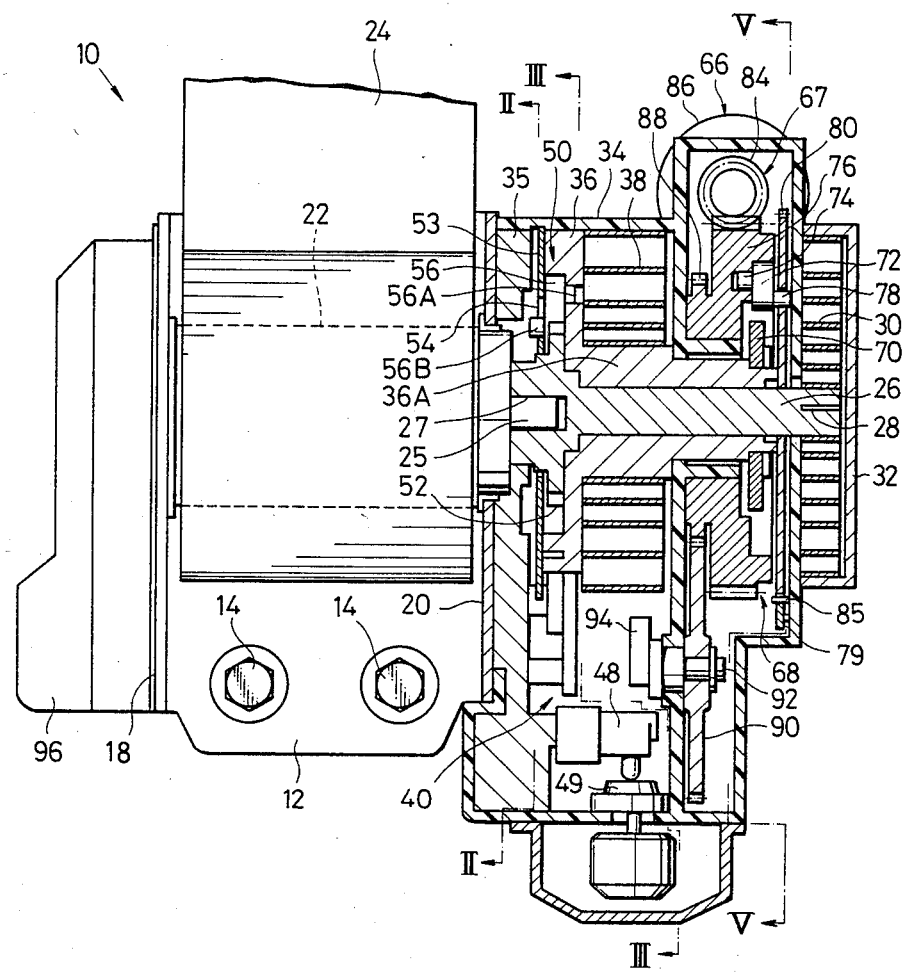
FIG. 1 is a sectional view showing a webbing retractor in which an embodiment of a webbing tension device according to the present invention is incorporated.

FIG. 1 illustrates an embodiment of a webbing retractor 10 in which a webbing tension device according to the present invention is assembled.

The webbing retractor 10 includes a frame 12 fixed to a vehicle body (not shown) by mounting bolts 14. The frame 12 is formed at both its sides with a pair of leg plates 18 and 20 extended in parallel with each other which rotatably support a webbing takeup shaft 22 at its both end portions. The takeup shaft 22 is secured at its intermediate portion with one end portion of an occupant restraining webbing 24, the other end portion thereof having a tongue plate secured thereto (not shown). The tongue plate can be latched to a buckle device (not shown), so that an intermediate portion of the webbing 24 can be applied over an occupant. The above construction is similar to a conventional webbing retractor.

One end portion of the takeup shaft 22 which extends through the leg plate 20 is formed with a rectangular portion 25 which is received within a rectangular recess 27 formed on one end portion of a smaller diameter rod 26. Thus, the smaller diameter rod 26 is connected coaxially to the takeup shaft 22 and is formed at the other end portion 28 with a slit 28 which is secured with an inner end portion of a small spiral spring 30 which acts as a small biasing means. The small spiral spring 30 is covered with a small spring case 32 and it is secured at its outer end portion thereto. The small spring case 32 is supported by the leg plate 20 through a case 34 and a sheet attached to the leg plate 20. The small spiral spring 30 biases the takeup shaft 22 weakly in a webbing winding direction (in a direction of arrow A of FIGS. 2 and 3), whereby, when the occupant wears the webbing 24, the webbing 24 contacts softly with the occupant.

Supported rotatably by the smaller diameter rod 26 about an outer periphery thereof is a tubular portion 36A of an operation wheel 36, so that the operation wheel 36 is rotatable relative to the takeup shaft 22. The tubular portion 36A is secured with an inner end portion of a large spiral spring 38 which acts as a large biasing force means, an outer end portion thereof being secured to an inner peripheral portion of the case 34.

The large spiral spring 38 has a larger biasing force than the small spiral spring 30. It biases the operation wheel 36 in a webbing winding direction, but ordinarily the operation wheel 36 is prevented from winding the webbing by trigger means 40. Only in an emergency vehicular situation is it allowed to rotate in a webbing winding direction.

Figure 3:
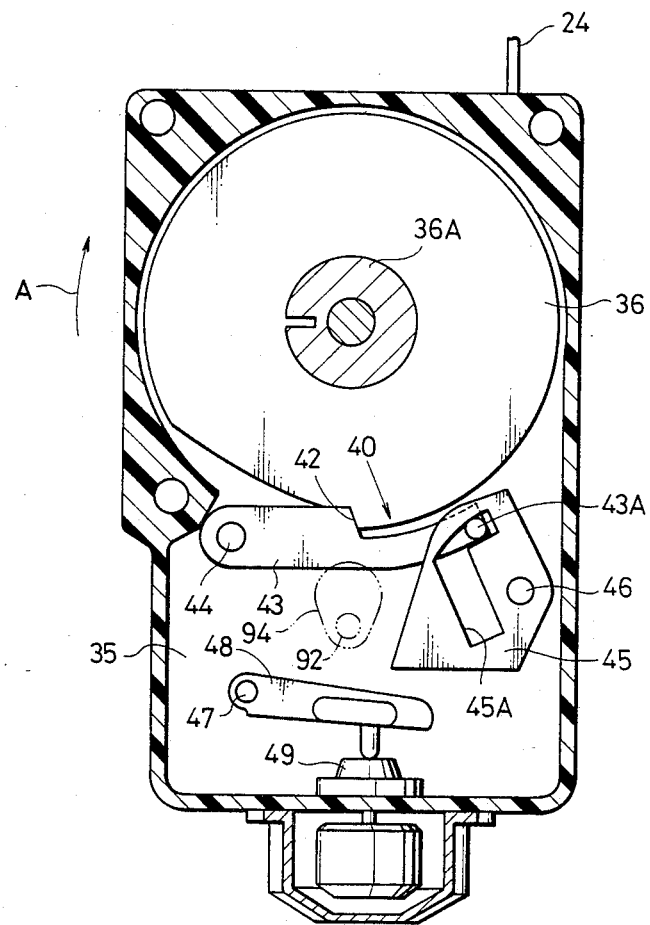
FIG. 3 is a sectional view taken along a line III—III of FIG. 1.
Figure 4:
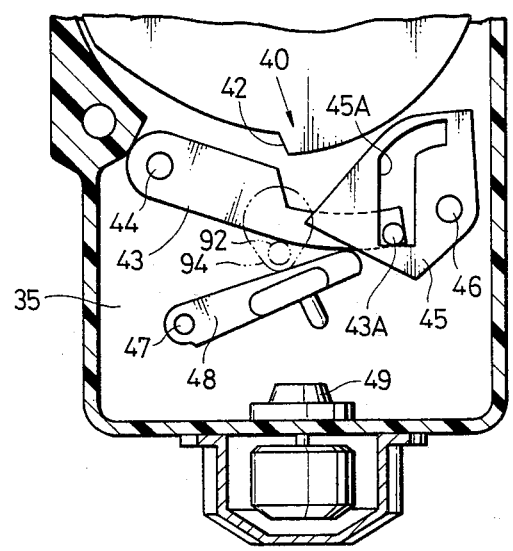
FIG. 4 is an operational view of FIG. 3.

As shown in FIGS. 3 and 4, the trigger means 40 includes a pawl 43 engaged with a cutout portion 42 of the operation wheel 36. This pawl is pivotally mounted on the case 34 through a pin 44. The rotation of the pawl 43 is controlled by a cam 45 so that it is separated from the operation wheel 36 in an emergency vehicular situation. The cam 45 is rotatably supported by the case 34 through a pin 46, and a pin 43A of the pawl 43 is received in an L-shaped groove 45A of the cam 45. The cam 45 is opposed to a sensor lever 48 rotatably mounted on the sheet 35 through a pin 47 and the sensor lever 48 is positioned on a pendulum 49 suspended from the sheet 35. In this situation, it is preferable to separate the sensor lever 48 and the cam 45 slightly from each other.

The cam 45 is disposed such than an arc-shaped portion of the L-shaped groove 45A formed on its one side about the pin 46 is tangentially situated with respect to the operation wheel 36. This arc-shaped portion receives the pin 43A therein in an ordinary running situation of the vehicle, as shown in FIG. 3. Accordingly, the pawl 43 is ordinarily maintained in an engaging position with respect to the operation wheel 36. In an emergency vehicular situation, the pendulum 49 acts as an acceleration sensor and swings in response to the abnormal acceleration, so that the sensor lever 48 is pushed up. This causes the cam 45 to rotatively move so that the other side of the L-shaped groove 45A communicating with the arc-shaped portion is situated radially with respect to the operation wheel 36, i.e., the pin 43A is positioned in the other side of the L-shaped groove 45A, so that the pawl 43 releases the operation wheel 36.

Since the pawl 43 is subjected to a weak biasing force from a biasing means (not shown) in the direction of approach to the operation wheel 36, it engages with the cutout portion 42 of the operation wheel 36. Also, because the sensor lever 48 is provided with a snap action mechanism, when the sensor lever 48 is pushed up slightly by the pendulum 49 to pass a predetermined boundary point, it rapidly rotates upwardly.

Disposed between the operation wheel 36 and the takeup shaft 22 is clutch means 50, through which the operation wheel 36 and the takeup shaft 22 are separated or released from each other in an ordinary situation of the vehicle, but through which a rotation of the operation wheel 36 is transmitted to the takeup shaft 22 in an emergency vehicular situation.

In the clutch means 50, the smaller diameter rod 26 connected to the takeup shaft 22 is fixed around an outer periphery of an end portion thereof with a gear wheel 52 which is formed at its outer periphery with a plurality of convex portions. Also, the outer periphery of the gear wheel 52 is opposed to a friction plate 53 which acts as a clutch plate, and levers 56 guided along guide holes 54 formed on the friction plate 53 are engaged with the gear wheel 52.

The friction plate 53 is coaxially mounted on the smaller diameter rod 26 with the takeup shaft 22 and is rotatable relative thereto, and is formed at its outer periphery thereof with arms 53A. The arms 53A are forced to contact with the sheet 35, so that the friction plate 53 is subjected to frictional resistance from the sheet 35 when the friction plate 53 rotates. Each of the levers 56 is formed at its base portion with a pin 56A which is received in circular holes formed on the operational wheel 36, and is rotatably supported thereby.

Figure 2:
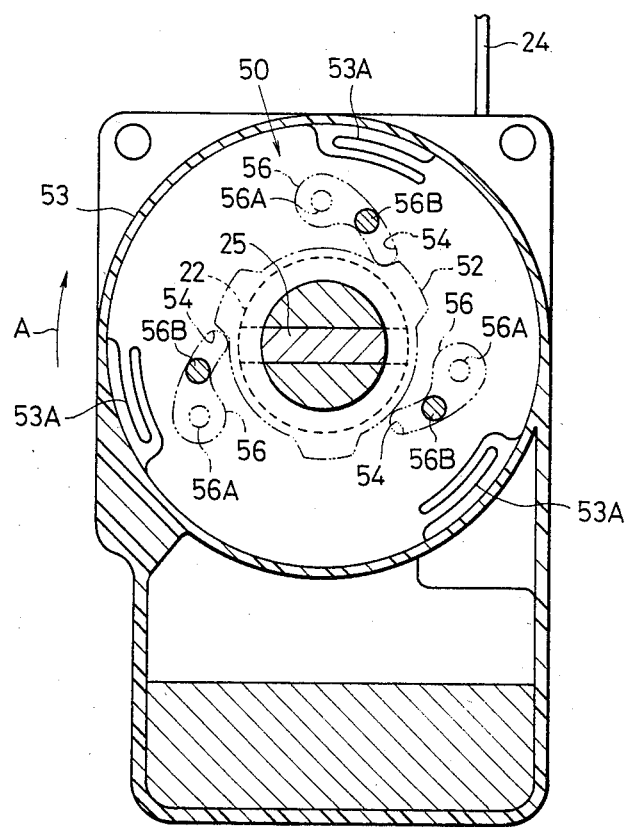
FIG. 2 is a sectional view taken along a line II—II of FIG. 1.

In addition, each of the levers 56 is formed at its distal portion with another pin 56B which projects in a reverse direction to the pin 56A, and each pin 56B is received in each of the guide holes 54 of the friction plate 53. As shown in FIG. 2, the friction plate 53 positions each of the pins 56B at an outermost end portion of each of the guide holes 54 to separate it from the gear wheel 52 in an ordinary running situation of the vehicle. However, in an emergency situation of the vehicle when the operation wheel 36 is rotated, each of pins 56B is guided along each of the guide holes 54 of the friction plate 53. As a result, the pins 56B engage the gear wheel 52 and the rotational force of the operation wheel 36 is transmitted to each of the levers 56 as a compressive force, whereby the gear wheel 52 is rotated in a webbing winding direction.

Within case 34, disposed between the large spiral spring 38 and the small spiral spring 30, are a winding-up drive means 66, a reduction means 67 and a clutch means 68.

Figure 5:
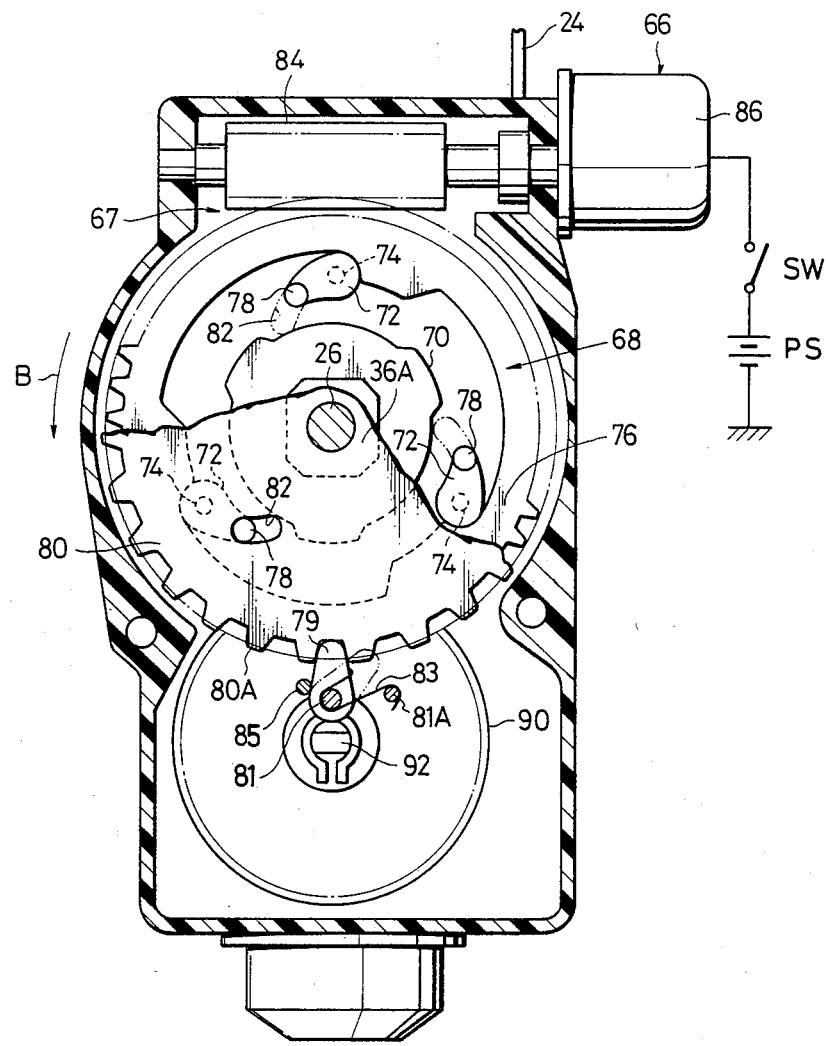
FIG. 5 is a sectional view taken along a line V—V of FIG. 1.
Figure 6:
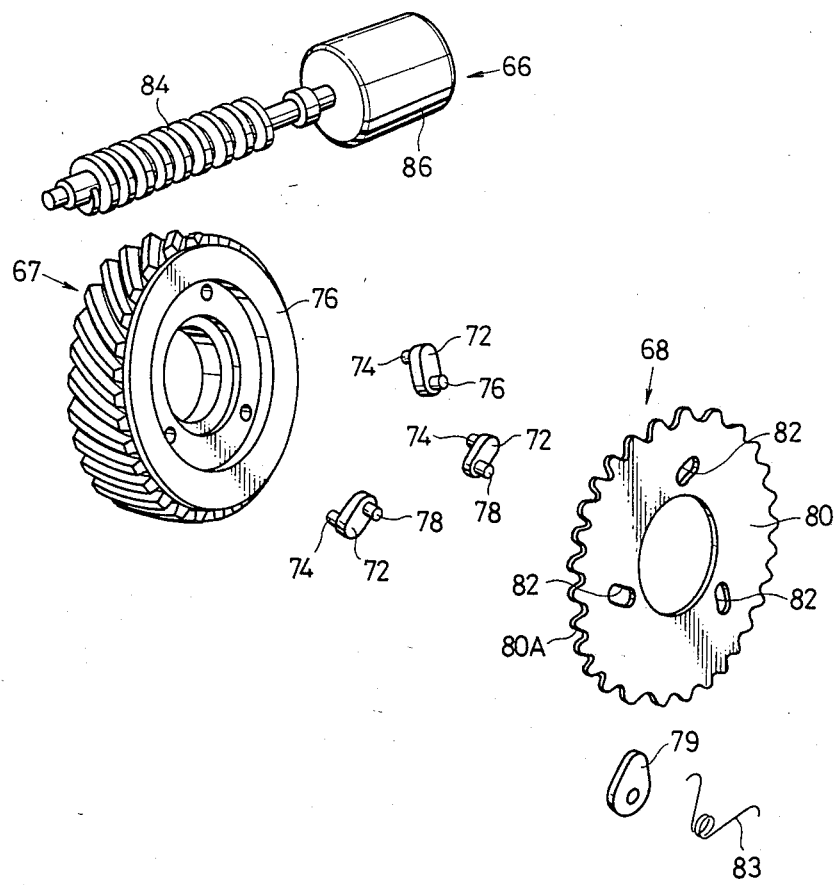
FIG. 6 is a disassembled perspective view of the winding-up drive means and clutch means of the invention.

As shown in FIG. 5, fixed to the tubular portion 36A of the operation wheel 36 is a gear wheel 70 which is opposed to three levers 72. Each of the levers 72 is projectingly formed at its base portion with a pin 74 rotatably supported by a worm wheel 76. Each of the levers 72 is also formed at its distal portion with another pin 78 projected in a reverse direction to the pin 74, the pins 78 being capable of engaging with an outer periphery of the gear wheel 70.

Also, the pins 78 are opposed to guide holes 82 of a reset wheel 80 disposed coaxially with the operation wheel 36. The reset wheel 80 has a function similar to the friction plate of the clutch means 50, but is formed at its outer periphery with a plurality of teeth 80A.

As shown in FIGS. 1 and 5, the teeth 80A engage a distal portion of a lever 79. The lever 79 is pivotally mounted on the case 34 through a pin 81 and is always biased in a counterclockwise direction in FIG. 5 by a torsion coil spring 83 through a pin 81A. However, the lever 79 is prevented from rotating in a counterclockwise direction by a stopper pin 85 provided on an inner face of the case 34.

Accordingly, the reset wheel 80 is rotatable only in a counterclockwise direction in FIG. 5, namely, in a winding-up direction relative to the large spiral spring 38, but at this time it is subjected to the resistance of the torsion coil spring 83 through the lever 79.

As a result, when the worm wheel 76 is rotated in the direction of arrow B on FIG. 5, the reset wheel 80 is subjected to the aforesaid resistance, so that the respective pins 78 are moved along the corresponding guide holes 82. After the pins 78 are moved to engage with the gear wheel 70, the reset wheel 80 is rotated together with the worm wheel 76, and the rotational force of the worm wheel 76 is transmitted to the operation wheel 36 through the gear wheel 70. Thus, the levers 72, the reset wheel 80, the lever 79 and the torsion coil spring 83 constitute a clutch means 68 of one-way type.

The worm wheel 76 comes into mesh with a worm gear 84 which is rotatably mounted within the case 34. One end portion of the worm gear 84 is extended through the case 34 and is connected to a motor 86 which forms a drive means, as shown in FIG. 5. Connected to the motor 86 is a switch SW connected to a power source PS which can drive the motor 86 by a one-touch operation of the occupant. Also included is a warning lamp (not shown) for preventing the occupant from forgetting the winding-up of the large spiral spring 38.

When the switch is switched on by the occupant, the motor 86 is rotated and the rotational force thereof is transmitted to the operation wheel 36 through the worm gear 84, worm wheel 76, and the clutch means 68. Thus, the motor 86 and the switch constitute the winding-up drive means 66 for winding up the large spiral spring 38, and the worm gear 84 and the worm wheel 76 constitute the reduction means 67.

The worm wheel 76 is integrally and coaxially connected to a pinion 88 which comes into mesh with a pinion 90 rotatably mounted on the case 34. The pinion 90 is fixed at its axial center with a cam rod 92, a distal portion thereof being fixed with an oval cam 94. The oval cam 94 is opposed to the sensor lever 48, and when the worm wheel 76 is rotated so that the cam 45 has been rotated by the sensor lever 48, as shown in FIG. 4, the oval cam 94 is also rotated through the pinions 88 and 90 and the cam rod 92, so that the sensor lever 48 is forcibly pushed down and it is returned back to its initial position shown in FIG. 3.

The other end portion of the takeup shaft 22 is extended through the leg plate 18, and an inertia locking mechanism (a construction thereof being omitted) is disposed between the leg plate 18 and the other end portion of the takeup shaft 22, as shown in FIG. 1. This construction prevents the takeup shaft 22 from rotating in a web-unwinding direction in an emergency situation of the vehicle.

A description will now be given of operation of the above embodiment.

The webbing 24 is free to unwind from the takeup shaft 22 in order to be worn by the occupant, and contacts softly with the occupant due to the small retractive biasing force applied by the small spiral spring 30. In an ordinary running situation of the vehicle, the occupant can easily change his attitude since the inertia locking mechanism 96 has not been triggered.

When the vehicle experiences an emergency situation such as a collision, the pendulum 49 swings sharply and pushes up the sensor lever 48 so that the cam 45 is rotated in the counterclockwise direction on FIG. 3. The pawl 43 is pushed down by the biasing force of the large spiral spring through the operation wheel 36, whereby the operation wheel 36 is rotated forcefully in the webbing-winding direction by the biasing force of the large spiral spring 38.

As the operation wheel 36 rotates, the levers 56 are also rotated and are guided along the guide holes 54 of the friction plate 53 and are subjected to rotational resistance through the arms 53A, so that they engage the gear wheel 52. As a result, the operation wheel 36 and the gear wheel 52 are connected to each other, and the biasing force of the large spiral spring 38 acts upon the takeup shaft 22. It should be noted that the friction plate 53 is rotated along with the operation wheel 36 after the operation wheel 36 and the gear wheel 52 become connected to each other in the aforementioned manner.

When the operation wheel 36 is rotated in the above manner, the winding-up drive means 66 does not prevent the operation wheel 36 from rotating since the worm wheel 76 is separated from the operation wheel 36 by the clutch means 68.

Consequently, the webbing 24 is wound on the takeup shaft 22 and a substantial tension is imparted to the webbing 24, so that the webbing 24 contacts closely with the occupant. Simultaneously therewith, any webbing-unwinding rotation of the takeup shaft 22 is prevented by the inertia-locking mechanism 96. Thus, the occupant is safely and securely restrained by the webbing 24.

In an emergency vehicular situation the biasing force of the large spiral spring 38 is spent in the above manner. Accordingly, when the webbing retractor 10 is to be reused, the large spiral spring 38 must be wound up in the counterclockwise direction on FIG. 5. In this embodiment, the shaft of the motor 86 can readily be made to rotate by a one-touch operation of occupant on the switch, whereby the winding-up of the large spiral spring 38 is conducted automatically. After the large spiral spring 38 is spent, the warning lamp is lighted, whereby the occupant is reminded to turn on the motor switch. The winding-up of the large spiral spring 38 is carried out as follows:

When the switch is switched on, the shaft of the motor 86 is rotated and the worm gear 84 is also rotated in the same direction as the motor 86, so that the worm wheel 76 is rotated with reduction in the direction of arrow B on FIG. 5. Since the reset wheel 80 is subjected to resistance from the lever 79 and the torsion coil spring 83 when it is rotated together with the worm wheel 76, the pins 78 of the levers 72 are moved along the guide holes 82, so that the levers 72 become engaged with the gear wheel 70.

Consequently, the driving force of the motor 86 is transmitted to the gear wheel 70 and the operation wheel 36, whereby the large spiral spring 38 is wound up against its own self-biasing force. After the pins 78 are engaged with the gear wheel 70, the reset wheel 80 is rotated together with the worm wheel 76, so that the lever 79 swings to the position shown in phantom on FIG. 5. The biasing force of the large spiral spring 38 is large, but it does not act upon the shaft of the motor 86 since the worm wheel 76 is prevented from reverse rotation by the worm 84.

When the operation wheel 36 is rotated by a predetermined angle, the pawl 43 engages the cutout portion 42 of the operation wheel 36 through the biasing force of a biasing means (not shown), whereby the operation wheel 36 is returned back to its initial position. Simultaneously therewith, the oval cam 94 is subjected to the rotational force of the worm wheel 76 through the pinions 90 and 88, and the sensor lever 48 is pushed down by the oval cam 94, so that the sensor lever 48 is returned back to the initial situation shown in FIG. 3. The cam 45 is rotated about the pin 46 by its own weight, so that it returns back to the initial position shown in FIG. 3.

After the winding-up of the large spiral spring 38 is accomplished, the warning lamp is turned off, which is confirmed by the occupant, whereby the switch is switched off by the occupant so that the motor 86 is stopped. When the rotation of the worm wheel 76 is stopped in response to the halting of the motor 86, the reset wheel 80 is rotated by a predetermined angle i the clockwise direction illustrated in FIG. 5 by the biasing force of the torsion coil spring 83 through the lever 79. As a consequence of the rotation of the reset wheel 80, the pins 78 of the levers 72 are released from the gear wheel 70, whereby the clutch means 68 is automatically disconnected.

Thus, the parts of the webbing retractor 10 are returned back to their initial position and the occupant is released from the restrained condition of the webbing. Also, the webbing can be comfortably worn by the occupant again, and in the next emergency situation of the vehicle the occupant can be put in a closely restrained position by the webbing.

As described above, in the embodiment the large spiral spring 38 can be wound up by the one-touch operation of the occupant on the switch. A combination of the worm 84 and the worm wheel 76 is used as the reduction means and, therefore, the biasing force of the large spiral spring 38 does not act upon the motor 86 even when the large spiral spring 38 is wound up by the motor 86. In addition, as the embodiment is constructed so that the reset wheel 80 is biased by the lever 79, the clutch means 68 is automatically disconnected after the winding-up of the large spiral spring 38 is accomplished.

In the above embodiment, the switch for the motor 86 is operated manually, but the motor 86 can be automatically controlled by a control means which detects when the working and the winding-up of the large spiral spring 38 has occurred, and stops the motor 86 accordingly.

What is claimed is:

1. A webbing tension device for imparting tension to an occupant restraining webbing during an emergency situation of a vehicle, which comprises:
   (a) a first biasing means for biasing a webbing takeup shaft in a web winding direction in an emergency vehicular situation;
   (b) a first clutch means disposed between the takeup shaft and the first biasing means for transmitting the biasing force of the first biasing means to the takeup shaft in the emergency vehicular situation;
   (c) a winding-up drive means for winding up the first biasing means after the biasing force of the first biasing means is spent in the emergency vehicular situation;
   (d) a reduction means for reducing the winding-up motion of the winding-up drive means; and
   (e) a second clutch means disposed between the first biasing means and the reduction means for transmitting the winding-up force of the winding-up drive means when the winding-up drive means is operated, thereby returning the first biasing means back to its initial condition.

2. A webbing tension device as set forth in claim 1, which further comprises a trigger means for actuating the first biasing means.

3. A webbing tension device as set forth in claim 2, which further comprises a second biasing means for continually biasing the takeup shaft in a web winding direction, the second biasing means having a smaller biasing force than the first biasing means, so that the webbing contacts softly with the occupant.

4. A webbing tension device as set forth in claim 3, wherein the reduction means includes a worm gear driven by the winding-up drive means, and a worm wheel engaged with the worm gear and disposed coaxially with the takeup shaft and rotatably mounted relative thereto.

5. A webbing tension device as set forth in claim 4, wherein an operation wheel is disposed coaxially with the takeup shaft and is rotatably mounted relative thereto, and the biasing force of the first biasing means is transmitted to the takeup shaft through the operation wheel.

6. A webbing tension device as set forth in claim 5, wherein the second clutch means includes at least one first lever rotatably mounted on the worm wheel, a first gear wheel coaxially fixed to the operation wheel, and a reset wheel disposed coaxially with respect to the gear wheel, the reset wheel being mutually rotatable with the worm wheel to guide the first lever to the first gear wheel in order to connect the gear wheel and the worm wheel when the worm wheel is rotated by the winding-up drive means, whereby the first biasing means is wound up by the winding-up drive means.

7. A webbing tension device as set forth in claim 6, wherein the second clutch means further includes a third biasing means for biasing the reset wheel in the reverse direction with respect to the rotational direction of the worm wheel, so that when the winding-up of the first biasing means is accomplished the reset wheel is rotated in the reverse direction, and the second clutch means is put in a disengaged condition.

8. A webbing tension device as set forth in claim 7, wherein the third biasing means includes a second lever engaged with the reset wheel through a spring for biasing the reset wheel in the reverse direction.

9. A webbing tension device as set forth in claim 8, wherein the first clutch means includes at least one third lever rotatably supported by the operation wheel, a second gear wheel rotatable along along with the takeup shaft, and a clutch plate disposed coaxially with the second gear wheel and mounted adjacent thereto, the clutch plate being rotatable along with the operation wheel to guide the third lever to the second gear wheel to engage the operation wheel and the second gear wheel when the operation wheel is rotated by the first biasing means, whereby the takeup shaft is rotated by the first biasing means in an emergency situation of the vehicle.

10. A webbing tension device as set forth in claim 9, wherein the trigger means includes a pendulum which detects an abnormal acceleration by swinging sharply, a sensor lever pushed up by the pendulum when the pendulum swings sharply, a cam rotated by the sensor lever when the sensor lever is pushed up, and a pawl which is latched to a cutout portion of the operation wheel in an ordinary running situation of the vehicle, the pawl being released from its latched position in the cutout portion when the cam is rotated, whereby the first biasing means is actuated.

11. A webbing tension device as set forth in claim 10, wherein the winding-up drive means is connected to a power source through a switch, so that when the switch is switched on the winding-up drive means is driven to wind up the first biasing means.

12. A webbing tension device adapted for use in a seatbelt system for securing an occupant of a vehicle during an emergency vehicular situation of the type wherein a webbing takeup shaft for winding an occupant restraining webbing thereon is always biased in a web winding direction by a small biasing means and the takeup shaft is biased in the web winding direction by a large biasing means in an emergency vehicular situation, thereby imparting an occupant securing tension to the webbing, comprising:
   (a) a first clutch means disposed between the takeup shaft and the large biasing means for transmitting the large biasing force of the large biasing means to the takeup shaft in the emergency vehicular situation;

(b) a winding-up drive means for winding up the large biasing means after the large biasing force is spent in the emergency situation of the vehicle;

(c) a reduction means for reducing the winding-up motion of the winding-up drive means;

(d) a second clutch means disposed between the large biasing means and the reduction means for transmitting the winding-up force of the winding-up drive means to the large biasing means when the winding-up drive means is actuated, thereby returning the large biasing means back to its initial condition; and (e) a trigger means for actuating the large biasing means in an emergency situation of the vehicle, whereby an occupant securing tension is imparted to the webbing by the large biasing means in an emergency vehicular situation.

13. A webbing tension device as set forth in claim 12, wherein the reduction means includes a worm gear engaged to a worm wheel and driven by the winding-up drive means, wherein said worm wheel is disposed coaxially with the takeup shaft and rotatably mounted relative thereto.

14. A webbing tension device as set forth in claim 13, wherein an operation wheel is disposed coaxially with the takeup shaft and rotatably mounted relative thereto, and wherein the large biasing force of the large biasing means is transmitted to the takeup shaft through the operation wheel.

15. A webbing tension device as set forth in claim 14, wherein the second clutch means includes at least one first lever pivotally mounted on the worm wheel, a first gear wheel fixed to the operation wheel coaxially therewith, and a reset wheel disposed coaxially with the gear wheel, the reset wheel being rotatable along with the worm wheel to guide the first gear wheel to connect the gear wheel and the worm wheel when the worm wheel is rotated by the wind-up drive means, whereby the large biasing means is wound up by the winding-up drive means.

16. A webbing tension device as set forth in claim 15, wherein the second clutch means further includes a second lever engaging the reset wheel and a spring biasing the second lever in the reverse direction relative to the rotational direction of the worm wheel, whereby when the windingup of the large biasing means is accomplished, the reset wheel is rotated in the reverse direction so that the second clutch means is put in a disengaged condition.

17. A webbing tension device adapted for use in a webbing retractor for winding an occupant restraining webbing therein and for imparting an occupant securing tension to the webbing in an emergency vehicular situation which comprises:

(a) a large spiral spring for biasing a webbing takeup shaft in a web winding direction in an emergency situation of the vehicle;

(b) a first clutch means disposed between the takeup shaft and the large spiral spring for transmitting the biasing force of the large spiral spring to the takeup shaft in the emergency vehicular stituation;

(c) a motor for winding up the large spiral spring after the biasing force of the large spiral spring is spent in the emergency situation of the vehicle;

(d) a reduction gear including a worm gear rotated by the motor and a worm wheel engaging the worm for reducing the rotational motion of the motor;

(e) a second clutch means disposed between the large spiral spring and the worm gear for transmitting the winding-up force of the motor to the large spiral spring when the motor is rotated, thereby returning the large spiral spring back to its initial condition, and (f) a trigger means for actuating the large spiral spring in the emergency situation of the vehicle, whereby an occupant securing tension is imparted to the webbing by the large spiral spring.

18. A webbing tension device as set forth in claim 17, wherein an inner end of the large spiral spring is secured to an operation wheel rotatably mounted on a small diameter rod connected to one end portion of the takeup shaft, whereby the takeup shaft is biased by the large spiral spring through the operation wheel.

19. A webbing tension device as set forth in claim 18, wherein the second clutch means includes at least one first lever pivotally mounted on the worm wheel, a first gear wheel fixed to the operation wheel coaxially therewith, and a reset wheel being rotatable along with the worm wheel to guide the first gear wheel to engage the gear wheel and the worm wheel when the worm wheel is rotated by the motor, whereby the large spiral spring is wound up by the motor.

20. A webbing tension device as set forth in claim 19, wherein the second clutch means further includes a second lever engaging the reset wheel, and a spring for biasing the second lever in the reverse direction to the rotational direction of the worm wheel, so that when the winding-up of the large spiral spring is accomplished, the reset wheel is rotated in the reverse direction by the second lever in order to put the second clutch means in a disengaged condition.

* * * * *